United States Patent [19]

Gohl et al.

[11] Patent Number: 4,722,795
[45] Date of Patent: Feb. 2, 1988

[54] POLYAMIDE HOLLOW FIBER FILTRATION MEMBRANE HAVING BARRIER LAYER

[75] Inventors: Hermann J. Gohl, Bisingen-Zimmern; Georg B. Mayer, Hechingen-Boll; Gunther F. Geiling, Hechingen, all of Fed. Rep. of Germany; Claes-Ake Gullberg, Lund, Sweden

[73] Assignees: Gambro Dialysatoren KG, Fed. Rep. of Germany; Gambro Lundia AB, Sweden

[21] Appl. No.: 782,597

[22] Filed: Sep. 30, 1985

Related U.S. Application Data

[63] Continuation of Ser. No. 510,297, Jul. 1, 1983, abandoned.

[30] Foreign Application Priority Data

Jul. 2, 1982 [SE] Sweden ............................ 8204103

[51] Int. Cl.$^4$ ............................................. B01D 13/04
[52] U.S. Cl. ......................... 210/500.23; 210/500.33; 210/500.38
[58] Field of Search ...................... 210/500.23, 500.33, 210/500.38; 55/158; 428/398

[56] References Cited

U.S. PATENT DOCUMENTS 4,181,694  1/1980  Hashino et al. .................. 210/500 X
4,229,291 10/1980  Walch et al. .................. 210/500.2 X

FOREIGN PATENT DOCUMENTS 0046816  3/1982  European Pat. Off. .
2001899  2/1979  United Kingdom .

OTHER PUBLICATIONS

Lefebvre, M. S. et al, "Permeability Parameters ...", in Ultrafiltration Membranes and Applications, A. R. Cooper, Editor, Plenum Press, N.Y., 1980, pp. 79–98.

Primary Examiner—David Sadowski
Attorney, Agent, or Firm—Lerner, David, Littenberg, Krumholz & Mentlik

[57] ABSTRACT

A filtration membrane is disclosed which has an ultrafiltration rate of between $200 \times 10^{-4}$ and $500 \times 10^{-4}$ ml/sec.$\times$cm$^2 \times$bar at 20° C. and which is substantially impermeable to albumin of a molecular weight of about 44,000 or greater. A process for producing a filtration membrane is also disclosed in which a polymer solution is extruded with a center liquid under conditions such that the ratio of the volume of polymer solution to the volume of center liquid is within the range of from about 2:1 to about 4:1 to form a membrane extrudate.

8 Claims, 1 Drawing Figure

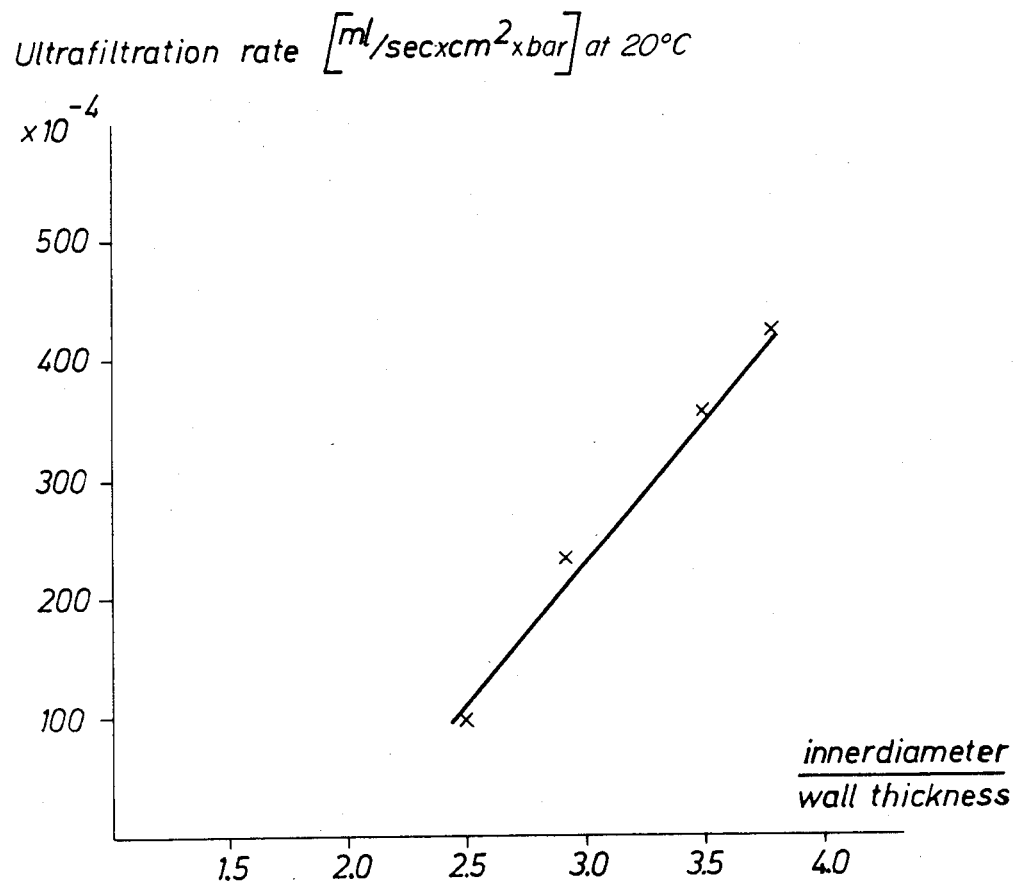

POLYAMIDE HOLLOW FIBER FILTRATION MEMBRANE HAVING BARRIER LAYER

This is a continuation of application Ser. No. 510,297 filed July 1, 1983, now abandoned.

BACKGROUND OF THE INVENTION

The invention relates to a filtration membrane, e.g., adapted for use in hemofiltration. The invention also relates to a process for producing such a membrane.

Hemofiltration membranes are well known in the art. For example, in Walch et al. U.S. Pat. No. 4,229,291 there is described a polyamide hemofiltration membrane as well as a process for producing the membrane. A similar membrane is described also in German Patent Publication No. DE-AS 22 36 226. Hemofiltration membranees made of polymers other than polyamide are also known and commercially available. Examples are membranes made of cellulose nitrate (Sartorius; Daicel), polyacrylonitrile (Asahi PAN 15; Rhone-Poulenc AN 69), polysulfone (Amicon), and polyether-polycarbonate block copolymer (European Patent Application No. 80105185.5).

A common drawback of these known membranes is their relatively low ultrafiltration rates (permeabilities to water). To compensate for these low ultrafiltration rates, relatively large membrane surface areas are used to obtain at least a minimal required liquid flow-through when the membranes are used in, for example, hemofiltration. Since the minimal required liquid flow-through is even higher in the filtration of infusion solutions, an even larger membrane surface area must therefore be used to compensate. To illustrate this, a known filtration membrane according to either of U.S. Pat. No. 4,229,291 or German Patent Publication No. DE-AS 22 36 226 (which have ultrafiltration rates of $10-20 \times 10^{-4}$ ml/sec.$\times$cm$^2 \times$bar and $10-30 \times 10^{-4}$ ml/sec.$\times$cm$^2 \times$bar, respectively) will need an available membrane surface area of at least 0.5–1 m$^2$ to be able to filtrate the required 100–200 ml/min. of infusion solution at a trans-membrane pressure of 100–300 mm.Hg.

SUMMARY OF THE INVENTION

It has now been found that these disadvantages in the prior art can be overcome in accordance with the present invention by a filtration membrane which has an ultrafiltration rate (permeability to water) of between $200 \times 10^{-4}$ and $500 \times 10^{-4}$ ml/sec.$\times$cm$^2 \times$bar (at 20° C.) and which is substantially impermeable to albumin of a molecular weight of about 44,000 or greater. Preferably, the membrane has a retention capability for albumin of molecular weight 44,000 of greater than 95%, more preferably greater than about 98%. The membrante of the invention is particularly suitable for use in hemofiltration.

The membrane of the invention provides far better liquid filtration rates than the known filtration membranes. The membrane of the invention therefore requires only a minimum of compensating surface area to be able to filtrate, for example, blood at the required flow-through rate in comparison to the known filtration membranes.

The present invention also is directed to a process for preparing membranes in which a polymer solution is extruded with a center liquid under conditions such that the ratio of the volume of polymer solution to the volume of center liquid is within the range of from about 1.4:1 to about 4:1 to form a membrane extrudate. The extrudate is then optionally washed. Preferably, the filtration membrane is produced in the form of a hollow fiber membrane.

BRIEF DESCRIPTION OF THE DRAWING

The FIGURE is a graphical representation showing the ultrafiltration rate (permeability to water) obtained employing various ratios of inner diameter/wall thickness with membranes obtained by the process in accordance with the present invention.

DETAILED DESCRIPTION OF THE INVENTION

The membrane of the invention is an asymmetric, self-supporting membrane. It may be in the form of a flat sheet, a tube or a hollow fiber. The hollow fiber shape is the most preferred form.

The present membrane is especially well adapted for use in hemofiltration. It should be noted, however, that the membrane is not restricted to such an application. It could be used as well in other filtration procedures requiring high flow-through rates such as, for example, filtration of infusion solutions, since the membrane to a large extent rejects endotoxins and pyrogens and most certainly bacteria and viruses. For illustrative purposes only, the description of the invention below will be concentrated on the hemofiltration applications.

In general, a membrane can be used for hemofiltration if it fulfills the following criteria: nontoxicity, blood compatibility, low tendency for the adsorption of proteins, sharp cut-off, high filtration rates and physical stability. For all these parameters, the chemical composition of the membrane material is a major factor, because it greatly influences the membrane structure and it also determines the interaction between blood and membrane.

Suitable membrane materials for use in the present invention which fulfill the above criteria may be polymers which are soluble in a polar, non-protonic organic solvent. Examples of such solvents are dimethylsulfoxide (DMSO), dimethylformamide (DMF), and dimethylacetate (DMAC). Examples of suitable polymers for the present membrane are polysulfone, polyethersulfone, polycarbonate, polyacrylonitrile, polyamide, and polystyrene. A preferred polymer is polyamide.

An example of an especially preferred polyamide according to the present invention is a polyamide having repeating units of the following chemical formula:

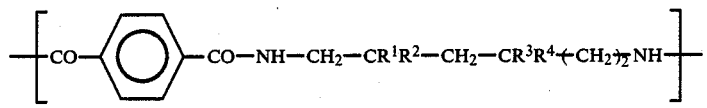

wherein $R^1$ is hydrogen and $R^2$, $R^3$ and $R^4$ are independently selected lower-alkyl groups, preferably methyl, or wherein $R^3$ is hydrogen and $R^1$, $R^2$ and $R^4$ are independently selected lower-alkyl groups, again preferably methyl. Such lower-alkyl groups include straight or branched chain alkyl groups containing 1 to 5 carbon atoms. A preferred polyamide is Trogamid T sold by Dynamit Nobel Company of West Germany.

The wall thickness of the membrane may vary, but is preferably within the range of from 40 to 100 μm with an inner barrier layer of about 0.1 μm. The cut-off of the membrane is preferably about 30,000 Daltons.

According to the present invention, a membrane of the above-mentioned type can be produced by extruding a polymer solution with a center liquid under conditions such that the ratio of the volume of a polymer solution to the volume of center liquid is within the range of from about 1.4:1 to 4:1, such as from about 2:1 to 4:1.

Under these process conditions, it has furthermore been found that optimal membrane characteristics can be obtained. For example, when (a) the inner diameter to wall thickness ratio of the hollow fiber membrane and (b) the polymer concentration of the polymer solution are properly adjusted with regard to each other, optimal characteristics can be obtained. In this respect, the inner diameter to wall thickness ratio may vary within the range of from 150:75 to 280:75, preferably from about 220:75 to 280:75. Expressed in another way, and as shown in the accompanying FIGURE, for the ultrafiltration rates of the membranes of the present invention i.e. from between $200 \times 10^{-4}$ and $500 \times 10^{-4}$ ml/sec.$\times cm^2 \times$bar (at 20° C.), the corresponding inner diameter to wall thickness ratios will vary within the range of from about 2.9:1 to 4.1:1. Similarly, the polymer concentration may vary within the range of from 5 to 20% by weight. A polymer concentration outside this range will lead to a membrane which is either too rubbery or which is inferior with regard to the ultrafiltration characteristics. A preferred polymer concentration is about 11% by weight.

To illustrate the importance of properly adjusting these two further process conditions to each other, when using a ratio of the volume of polymer solution to the volume to center liquid within the abovementioned range of from 1.4:1 to 4:1, reference is made to the accompanying FIGURE. This FIGURE graphically illustrates the variation of ultrafiltration rate obtained as the ratio of the inner diameter to wall thickness ratio changes in the membranes produced by the process in accordance with the invention. In the example shown in the graphs, the wall thickness is invariable (75 μm) and the polymer concentration used is 11% by weight.

From this illustrated example, it can be seen that, by increasing of the inner diameter to wall thickness ratio at an invariable wall thickness, the ultrafiltration rate of the hollow fiber membrane is increased. In the illustrated inner diameter to wall thickness ratio of 2 to 4, the ultrafiltration rate increases along a straight line according to the relation: ultrafiltration rate=$k \times$inner diameter/wall thickness.

Moreover, it has been expectedly found with the membrane of the present invention that, when the ultrafiltration rate is increased to within the illustrated range, the cut-off of the membrane does not increase to high cut-off values; but rather, it variably is fixed at about 30,000 Daltons. Furthermore, it has been found that the membrane characteristics as regard the cut-off are uniform at higher inner diameter:wall thickness ratios.

One possible theory for explaining this unexpected phenomena could be that at higher inner diameter to wall thickness ratios more precipitating agent as calculated with reference to the polymer concentration is available and that the polymer solution therefore will precipitate more rapidly. This will lead to a more uniform inner barrier layer of the membrane wall structure. It is known in the art that the pore size, pore distribution and occurrence of the barrier layer have influences on the cut-off value and the ultrafiltration characteristics of the membrane. Apparently, a very high occurrence and uniformity of the inner barrier layer is obtained with the present innver diameter to wall thickness ratios.

For example, at an inner diameter to wall thickness ratio of 200:75 and a polymer concentration of 11% by weight, the ultrafiltration rate of the membrane will be less than $100 \times 10^{-4}$ ml/cm$^2 \times$atm., while the ultrafiltration rate is about $400 \times 10^{-4}$ ml/sec.$\times cm^2 \times$atm. at an inner diameter to wall thickness ratio of 250:75.

It has been found that, at an inner diameter to wall thickness ratio of 220:75 and a polymer concentration of about 11% by weight, maximal ultrafiltration rates (up to $500 \times 10^{-4}$ ml/sec.$\times cm^2 \times$atm.) and simultaneously good retention capability for high molecular weight proteins can be obtained. One way to provide the high permeable membranes in the extrusion process of the invention is to assure that the polymer solution after leaving the die and before reaching a first wash bath is completely exchanged by the center liquid from inside of the hollow fiber. This can be done by controlling the residence time in the ambient atmosphere before the hollow fiber extrudate reaches said first wash bath, i.e., the residence time is above a predetermined minimum time and the distance between the die and the wash bath is at least a minimal distance.

For example, when the distance between the die and the wash bath is at least 1 meter, the minimal residence time in the ambient atmospheres is about 2 sec. (at a hollow fiber production rate of 30 meters/minute) before the hollow fiber extrudate is introduced into the wash bath. After this residence time, the hollow fiber extrudate is completely formed inside, i.e., the hollow fiber extrudate will be be affected by the wash bath. Consequently, there will be formed no outer barrier layer, which would occur if the residence time under the given conditions is too short.

Examples of polymers for the polymer solution may be the polymers mentioned above, and examples of suitable solvents may be DMSO, DMF, DMAC or similar polar, non-protonic organic solvents. Water may be used as said center liquid, preferably, deionized water.

The polymer solution viscosity is generally from about 100 to about 3,000 cps., preferably about 300 cps., as measured at 20° C.

The following examples are presented to illustrate the practice of the invention and are not intended to limit the scope thereof.

EXAMPLE 1

11% by weight of polyamide (Trogamid T from Dynamit Nobel Company of West Germany) was dissolved in DMSO at room temperature, and the solution was filtered and degassed. The polymer solution viscosity was 300 cps.

The polymer solution and ion-free water as a center liquid were extruded through an annular die at extrusion rates of 105 ml/hr and 50 ml/hr, respectively, to form a hollow fiber extrudate having an inner diameter of 190 μm and an outer diameter of 340 μm. After passing a 1 meter height of fall through the ambient atmosphere, the hollow fiber extrudate was introduced into a first wash bath and consecutively through subsequent wash baths of different temperatures with different residence times, until the solvent had been completely washed out.

The hollow fiber obtained according to this example provided the following characteristics:

Hydraulic permeability (20° C.): $80 \times 10^{-4}$ ml/sec.$\times$cm$^2 \times$atm.

Retention capability for Ov-albumin ($M_w$ 44,000): 98%

Retention capability for human albumin ($M_w$ 68,000): 100%

EXAMPLE 2

The process as in Example 1 was repeated, except that the dimensions of the hollow fiber were varied by varying the volume rates of center liquid (88 ml/hr) and polymer solution (126 ml/hr). The inner diameter of the hollow fiber was 250 μm and the outer diameter was 400 μm.

The hollow fiber obtained from this process had the following characteristics:

Hydraulic permeability (20° C.): $400 \times 10^{-4}$ mlsec.$\times$cm$^2 \times$atm.

Retention capability for Ov-albumins ($M_w$ 44,000): 98%

Retention capability for human albumin ($M_w$ 68,000): 100%

EXAMPLE 3

The process as in Example 1 was again employed, except that the dimensions of the hollow fiber were again varied by varying the volume rate of center liquid (64 ml/hr) and polymer solution (110 ml/hr). The inner diameter of the hollow fiber was 220 μm and the outer diameter was 370 μm.

The hollow fiber obtained had the following characteristics:

Hydraulic permeability (20° C.): $200 \times 10^{-4}$ ml/sec.$\times$cm$^2 \times$atm.

Retention capability for Ov-albumin ($M_w$ 44,000): 98%

Retention capability for human albumin ($M_w$ 68,000): 100%

When used in a hemofilter having an effective membrane surface area of 1.16 m$^2$ and an effective hollow fiber length of 25 cm, this hollow fiber had a filtration performance for blood (25% Hct, 70 mg/l total albumin, 37° C.) of 120 ml/min. The blood flow rate was 350 ml/min.

When used as an infusion solution filter having a surface area of 0.1 m$^2$ and an effective hollow fiber length of 10 cm, this hollow fiber filtered 300 ml/min. of infusion solution at a transmembrane pressure of 200 mm Hg. When the filtered infusion solution contained 1,000 ng/l endotoxins, no endotixins could be detected in the filtrate (Detectable limit 0.05 ng/l). Examples of such tested endotoxins are E-Coliendotoxin and Lysate IGQ having molecular weights of between 50,000 and $1 \times 10^6$ Daltons.

It will be understood that the embodiments described herein are merely exemplary and that a person skilled in the art may make many variations and modifications without departing from the spririt and scope of the invention. All such modifications and variations are intended to be included within the scope of the invention as defined in the appended claims.

What is claimed is:

1. A filtration membrane in the form of a hollow fiber prepared by extruding a polymer solution containing a bicompatible polyamide in the form of a hollow fiber in an amount of from 5 to 20% by weight and having a viscosity of 100 to 3000 cps. measured at 20° C. in the presence of a center liquid so as to provide a hollow fiber membrane having a barrier layer on one surface thereof, an inner diameter to wall thickness ratio within the range of from about 2.9:1 to 4.1:1 and having an ultrafiltration rate for water of between $200 \times 10^{-4}$ and $500 \times 10^{-4}$ ml/sec.$\times$cm$^2 \times$bar at 20° C., said polyamide having repeating units of the following chemical formula:

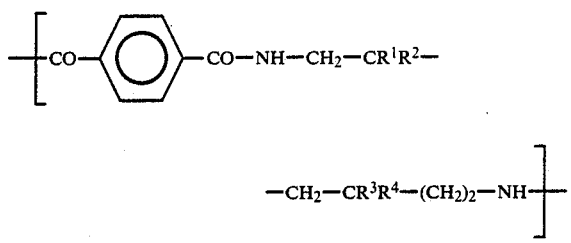

wherein $R^1$ is hydrogen and $R^2$, $R^3$ and $R^4$ are independently selected lower-alkyl groups, or wherein $R^3$ is hydrogen and $R^1$, $R^2$ and $R^4$ are independently selected lower-alkyl groups, said hollow fiber membrane being substantially impermeable to albumin of a molecular weight of about 44,000 or greater.

2. A membrane according to claim 1, wherein said membrane has a wall thickness of from 40 to 100 μm and has a molecular weight cut-off of about 30,000 Daltons.

3. A filtration membrane according to claim 1, wherein the membrane has been washed.

4. A filtration membrane according to claim 1, wherein said polymer solution comprises said polymer and a polar, non-protonic, organic solvent in which said polymer is soluble.

5. A filtration membrane according to claim 4, wherein said polymer solution contains about 11% by weight of said polymer.

6. A filtration membrane according to claim 1, wherein said lower-alkyl groups are methyl groups.

7. A filtration membrane according to claim 1, wherein said polymer solution has a viscosity of about 300 cps. measured at 20° C.

8. A filtration membrane according to claim 1, wherein said polymer solution is extruded with a center liquid under conditions such that the ratio of the volume of polymer solution to the volume of center liquid is within the range of from about 1.4:1 to about 4:1 to form a membrane extrudate.

* * * * *

UNITED STATES PATENT AND TRADEMARK OFFICE
CERTIFICATE OF CORRECTION

PATENT NO. : 4,722,795
DATED : February 2, 1988
INVENTOR(S) : Hermann J. Gohl et al It is certified that error appears in the above-identified patent and that said Letters Patent is hereby corrected as shown below:

Column 1, line 18, delete "membranees" and substitute therefor --membranes--.

Column 1, line 55, delete "membrante" and substitute therefor --membrane--.

Column 3, line 61, delete "variably" and substitute therefor --invariably--.

Column 4, line 9, delete "innver" and substitute therefor --inner--.

Column 4, line 39, following "will" insert --not--.

Column 5, line 23, delete "mlsec." and substitute therefor --ml/sec.--

Column 6, line 7, delete "bicompatible" and substitute therefor --biocompatible--.

Signed and Sealed this

Twelfth Day of July, 1988

Attest:

DONALD J. QUIGG

*Attesting Officer*　　　*Commissioner of Patents and Trademarks*